US012657367B2

(12) United States Patent
Schaefer et al.

(10) Patent No.: US 12,657,367 B2
(45) Date of Patent: Jun. 16, 2026

(54) INTEGRATED CIRCUIT USING MULTIPLE AND DIFFERENT PROCESS CORNERS

(71) Applicants:Advanced Micro Devices, Inc., Santa Clara, CA (US); ATI Technologies ULC, Markham (CA)

(72) Inventors: Alexander W. Schaefer, Austin, TX (US); Robin Andrew Joyce, Austin, TX (US); Shaun M. Kittle, Austin, TX (US); Scott Eugene Swanstrom, Austin, TX (US); Josef Alexander Czaban, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 1029 days.

(21) Appl. No.: 17/722,009

(22) Filed: Apr. 15, 2022

(65) Prior Publication Data

US 2023/0334214 A1 Oct. 19, 2023

(51) Int. Cl.
*G06F 30/392* (2020.01)
*G03F 1/68* (2012.01)
*G06F 119/18* (2020.01)

(52) U.S. Cl.
CPC .............. *G06F 30/392* (2020.01); *G03F 1/68* (2013.01); *G06F 2119/18* (2020.01)

(58) Field of Classification Search
USPC .......................................................... 716/55
See application file for complete search history.

(56) References Cited

U.S. PATENT DOCUMENTS

| | | | |
|---|---|---|---|
| 5,600,171 A | | 2/1997 | Makihara et al. |
| 5,917,224 A | * | 6/1999 | Zangara ................. H10B 20/00 |
| | | | 257/E27.102 |
| 6,380,636 B1 | | 4/2002 | Tatsukawa et al. |
| 6,803,178 B1 | | 10/2004 | Subramanian et al. |
| 7,368,225 B1 | | 5/2008 | Subramanian et al. |
| 7,785,946 B2 | * | 8/2010 | Haffner ............. H01L 21/28123 |
| | | | 430/394 |
| 7,919,792 B2 | | 4/2011 | Law et al. |
| 8,134,870 B2 | | 3/2012 | Alami et al. |
| 8,212,295 B2 | | 7/2012 | Liaw |
| 8,293,656 B2 | * | 10/2012 | Kim .................... H01L 21/0337 |
| | | | 438/735 |
| 8,656,322 B1 | * | 2/2014 | Dechene ................. G06F 30/39 |
| | | | 716/55 |

(Continued)

*Primary Examiner* — Mohammed Alam

(74) *Attorney, Agent, or Firm* — Kowert, Hood, Munyon, Rankin & Goetzel, P.C.; Rory D. Rankin

(57) ABSTRACT

A system and method for creating layout for semiconductor chips are described. In various implementations, an integrated circuit includes at least a first functional block and a second functional block. The first functional block includes circuitry that has a first set of parameters of a first process corner. The second functional block includes circuitry that has a second set of parameters of a second process corner different from the first set of parameters of the first process corner. For a same set of operating conditions, the second functional block has device characteristics different from device characteristics of the first functional block based on the first process corner and the second process corner being different from one another. The integrated circuit is fabricated with a process corner mask that indicates which areas of the die use the first process corner and which areas use the second process corner.

20 Claims, 5 Drawing Sheets

Circuitry 180 — Includes circuitry that has parameters of a first process corner Integrated Circuit 110

Process Corner Mask 190

Circuit Design Components 100

Block 160 — Processor Core 120a
Block 162 — Processor Core 120b
Block 164 — Processor Core 120c
Block 166 — Processor Core 120d
Processor Core 120e — Block 174
Processor Core 120f
Processor Core 120g
Processor Core 120h
Cache 130
Block 176
Interface 140

Block 168
Block 170
Block 172
Unit 150

Remainder of Integrated Circuit includes circuitry that has parameters of a second process corner different from the first process corner Transparent Portion of Mask 194

Opaque Portion of Mask 192

(56) References Cited

U.S. PATENT DOCUMENTS

| | | | |
|---|---|---|---|
| 8,658,486 B2 | 2/2014 | Aquilino et al. | |
| 8,701,077 B1 * | 4/2014 | Lemsitzer ................ | G11C 7/24 716/139 |
| 8,750,011 B2 | 6/2014 | Liaw | |
| 8,799,834 B1 * | 8/2014 | Chen ..................... | G06F 30/398 716/54 |
| 9,147,730 B2 | 9/2015 | Xie et al. | |
| 9,405,879 B2 | 8/2016 | Wang et al. | |
| 9,710,589 B2 * | 7/2017 | Dave ..................... | H10D 84/038 |
| 2008/0251878 A1 | 10/2008 | Mandelman et al. | |
| 2010/0283051 A1 * | 11/2010 | Mayor .............. | G01R 31/3016 716/101 |
| 2013/0174106 A1 * | 7/2013 | Hsu ........................ | G06F 30/00 716/55 |
| 2013/0313647 A1 * | 11/2013 | Aquilino ............. | H10D 84/017 438/296 |
| 2014/0145342 A1 * | 5/2014 | Schultz ................ | G03F 7/0035 257/773 |
| 2014/0339647 A1 * | 11/2014 | Rashed ............... | H10D 84/834 438/294 |
| 2015/0095863 A1 * | 4/2015 | Moughabghab ...... | G06F 30/398 716/109 |
| 2015/0278428 A1 * | 10/2015 | Wang ................... | G06F 30/398 716/112 |
| 2015/0339428 A1 * | 11/2015 | Yuan .................... | G06F 30/394 716/55 |
| 2016/0049190 A1 | 2/2016 | Han et al. | |
| 2016/0171137 A1 * | 6/2016 | Wu ....................... | G06F 30/367 716/106 |
| 2023/0334214 A1 * | 10/2023 | Schaefer ................ | G06F 30/39 |

* cited by examiner

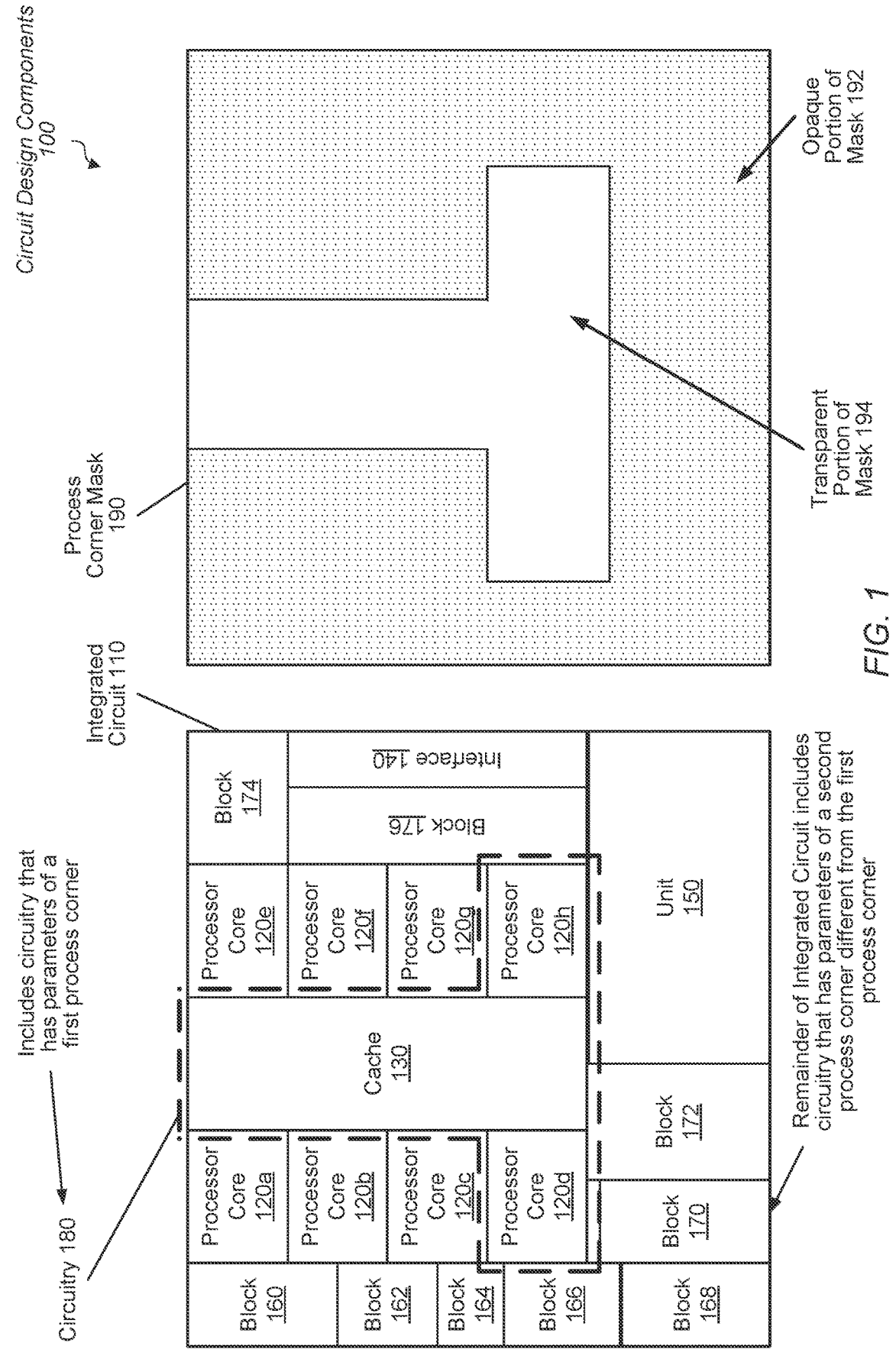

*Circuit Design Components*
*100*

Process
Corner Mask
190

Opaque
Portion of
Mask 192

Transparent
Portion of
Mask 194

Integrated
Circuit 110

Includes circuitry that
has parameters of a
first process corner

Circuitry 180

Remainder of Integrated Circuit includes
circuitry that has parameters of a second
process corner different from the first
process corner Block
174

Interface 140

Block 176

Processor
Core
120e

Processor
Core
120f

Processor
Core
120g

Processor
Core
120h

Unit
150

Cache
130

Processor
Core
120a

Processor
Core
120b

Processor
Core
120c

Processor
Core
120d

Block
172

Block
170

Block
160

Block
162

Block
164

Block
166

Block
168

*FIG. 1*

*Method*
*200*

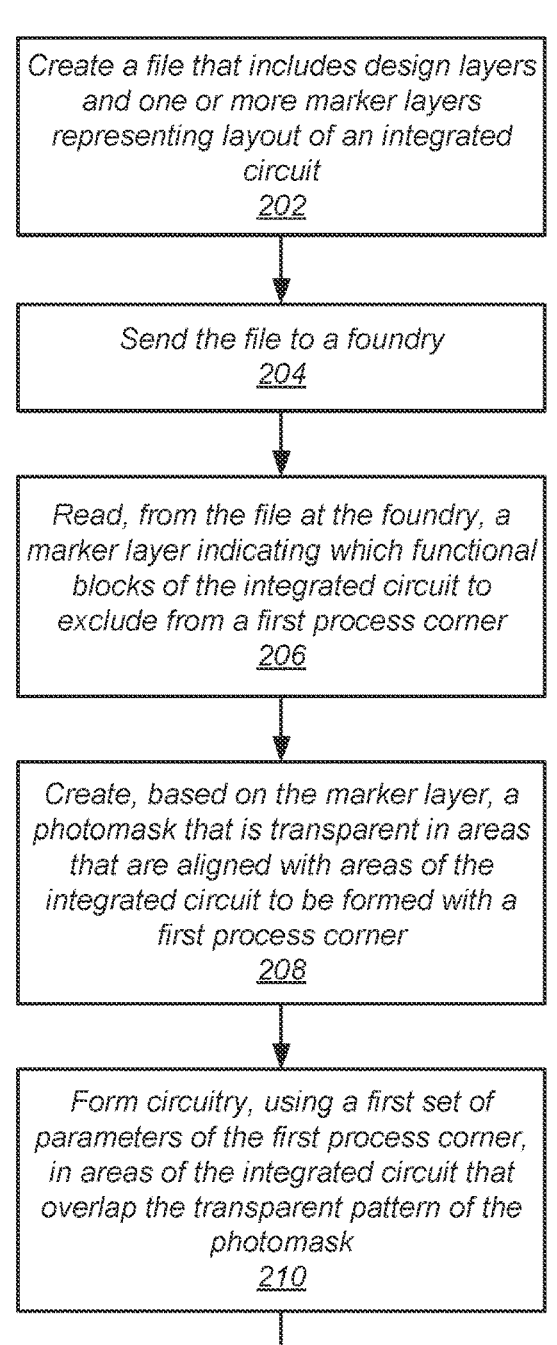

Create a file that includes design layers and one or more marker layers representing layout of an integrated circuit
202

Send the file to a foundry
204

Read, from the file at the foundry, a marker layer indicating which functional blocks of the integrated circuit to exclude from a first process corner
206

Create, based on the marker layer, a photomask that is transparent in areas that are aligned with areas of the integrated circuit to be formed with a first process corner
208

Form circuitry, using a first set of parameters of the first process corner, in areas of the integrated circuit that overlap the transparent pattern of the photomask
210

Form circuitry, using a second set of parameters of a second process corner, in areas of the integrated circuit that overlap the opaque areas of the photomask
212

*FIG. 2*

*Computing System 300*

Data Storage
330

Mask Layout Data
332

Process Corner Mask
333

Netlist
334

Design Rule Checks
336

Organizational Center
310

Network
340

Tools 360

Circuit Simulator
364

Mask Layout Editor
362

Processing Unit
370

Server 320A

Server 320D

Client Device
350

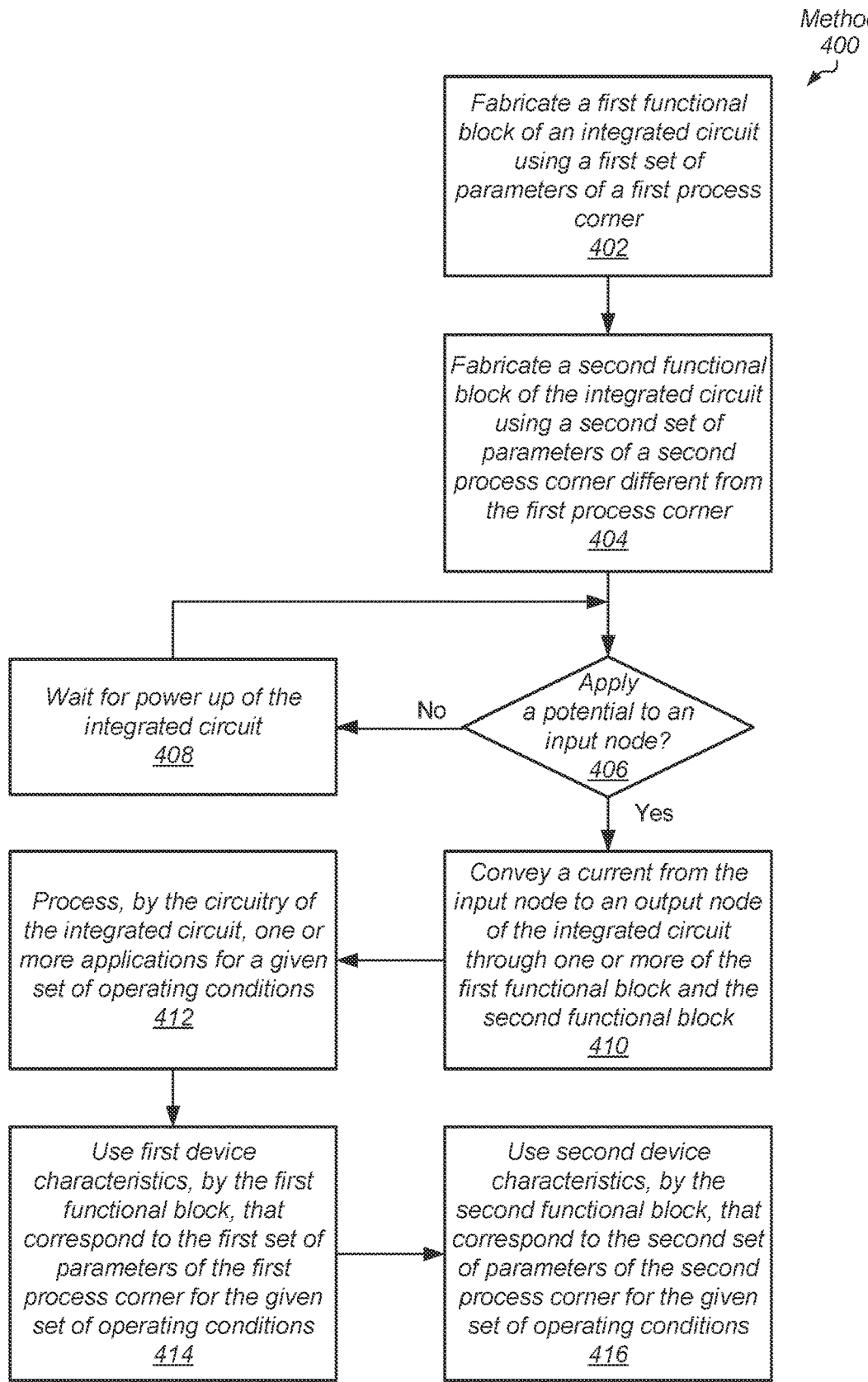

*Method*
*400*

Fabricate a first functional block of an integrated circuit using a first set of parameters of a first process corner
402

Fabricate a second functional block of the integrated circuit using a second set of parameters of a second process corner different from the first process corner
404

Wait for power up of the integrated circuit
408

No

Apply a potential to an input node?
406

Yes

Process, by the circuitry of the integrated circuit, one or more applications for a given set of operating conditions
412

Convey a current from the input node to an output node of the integrated circuit through one or more of the first functional block and the second functional block
410

Use first device characteristics, by the first functional block, that correspond to the first set of parameters of the first process corner for the given set of operating conditions
414

Use second device characteristics, by the second functional block, that correspond to the second set of parameters of the second process corner for the given set of operating conditions
416

*FIG. 4*

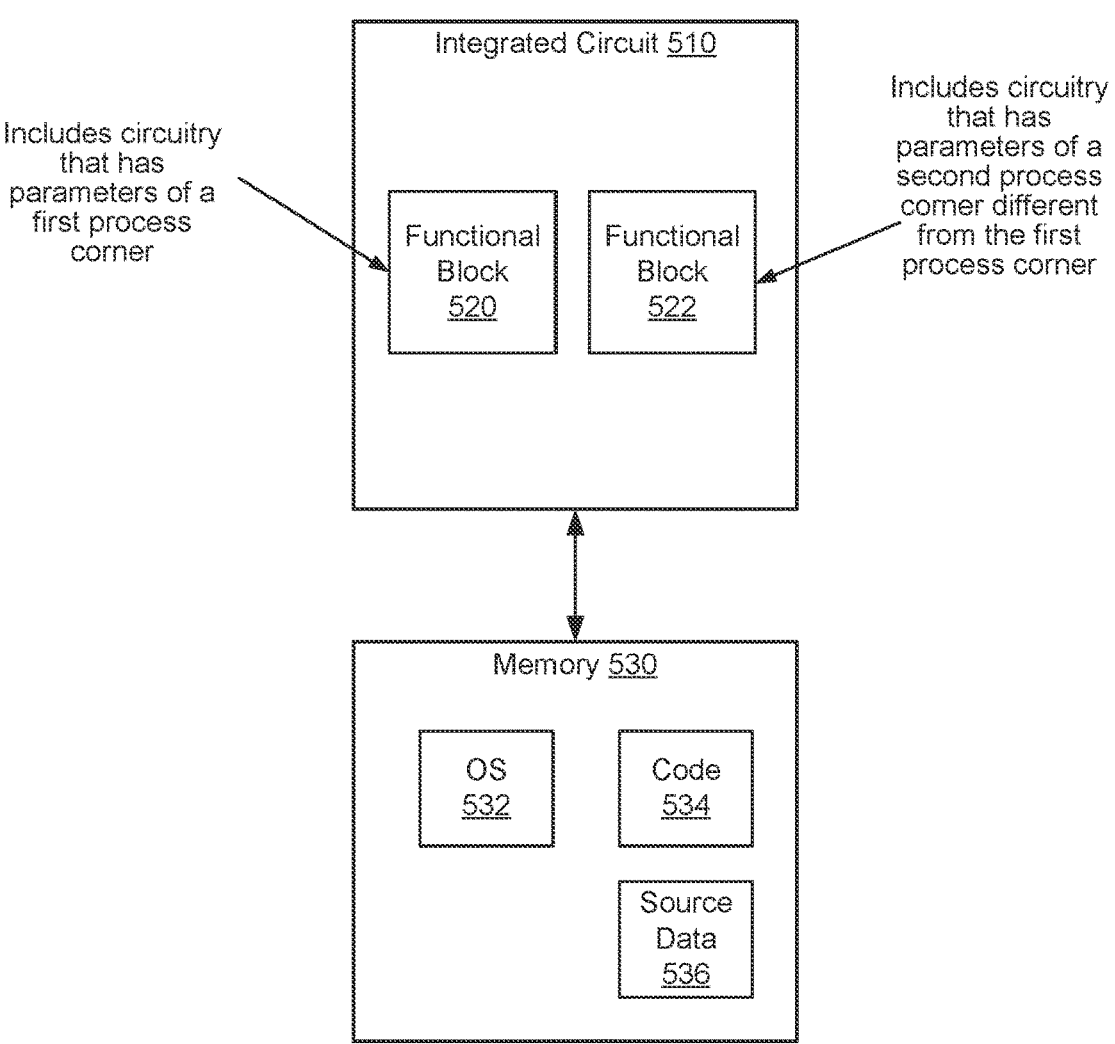
FIG. 5

INTEGRATED CIRCUIT USING MULTIPLE AND DIFFERENT PROCESS CORNERS

BACKGROUND

Description of the Relevant Art

As both semiconductor manufacturing processes advance and on-die geometric dimensions reduce, semiconductor chips provide more functionality and performance while consuming less space. In order to shorten the design cycle for these semiconductor chips, manual full-custom designs are replaced with automation where possible. A designer provides a description of a functional block in a high-level description language such as Verilog, VHDL and so on. A synthesis tool receives the logic description and provides the logical netlist and layout characteristics. At times, though, the automated process does not satisfy each of the rules directed at performance, power consumption, signal integrity, process yield, and so on. Therefore, designers manually create these cells in these circumstances to achieve better results. The place-and-route tool uses a cell layout library that includes both synthesized and custom cells to provide the physical layout.

When the design of the semiconductor chip completes, one or more technical files are sent to an integrated circuit fabrication company, or foundry, to fabricate the semiconductor chip. The integrated circuit foundry is instructed as to what process corner to use for the entire die of the semiconductor chip. For example, when the semiconductor chip is used in high-performance desktops, a high-performance process corner is selected for the entire die. Typically, the selected process corner is used for the entire die of the semiconductor chip. When the semiconductor chip is used in mobile computing products, such as laptops, smartwatches, and smartphones, a low-power process corner is selected for the entire die. The fabrication foundry includes other process corners such that a variety of process corners are available for the entire die. The high-performance process corner includes high-performance transistors, which operate with appreciable leakage current that contributes to the relatively high-power consumption. Selecting the low-power process corner includes transistors that have reduced leakage current, but cannot provide the higher performance.

In view of the above, efficient methods and systems for creating layout for semiconductor chips are desired.

BRIEF DESCRIPTION OF THE DRAWINGS

FIG. 1 is a generalized diagram of circuit design components.

FIG. 2 is a generalized diagram of a method for creating layout for semiconductor chips.

FIG. 4 is a generalized diagram of a method for creating layout for semiconductor chips.

FIG. 5 is a generalized diagram of a computing system.

Figure 3:
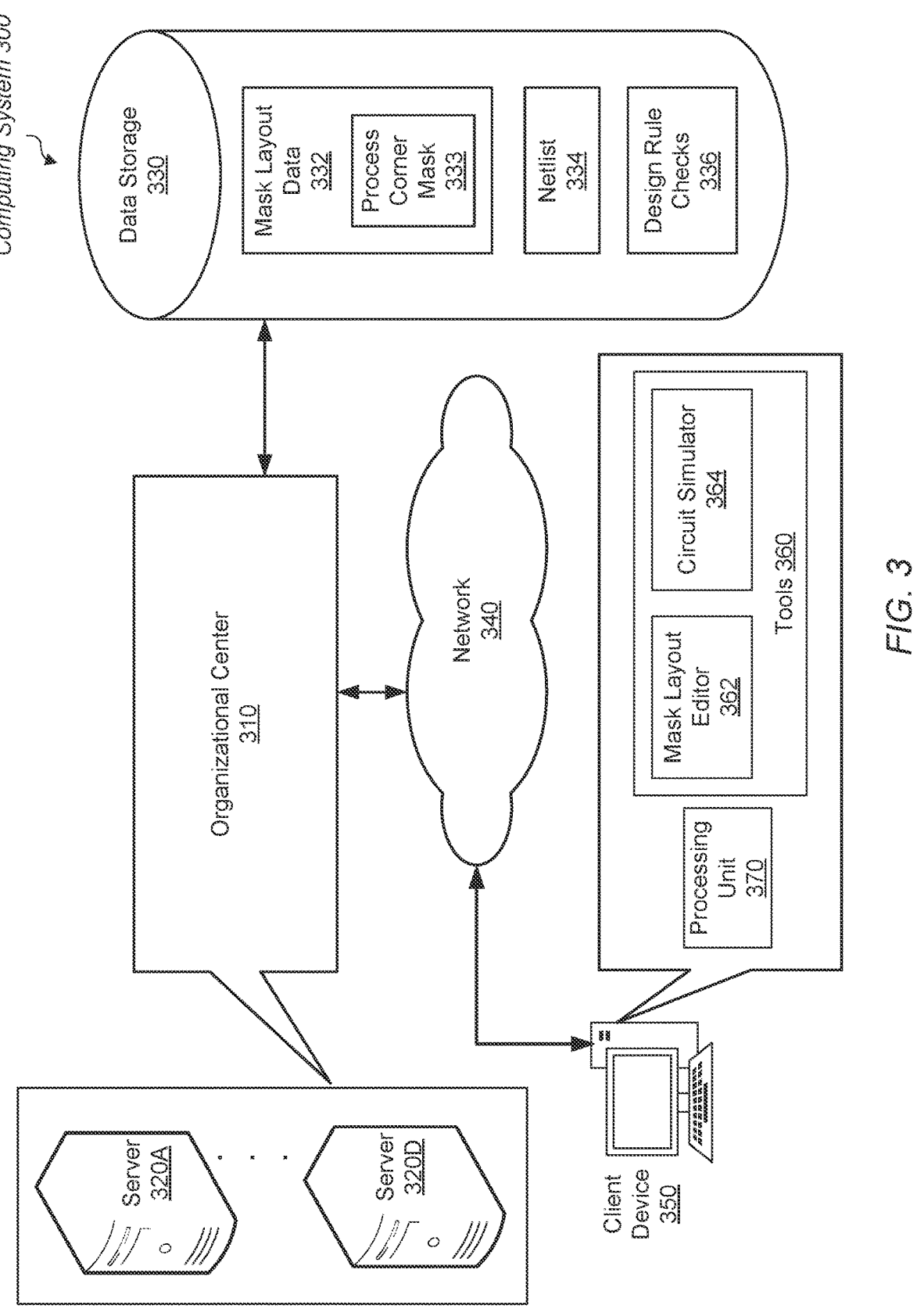
FIG. 3 is a generalized diagram of a computing system.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems and methods for creating layout for semiconductor chips are contemplated. In various implementations, an integrated circuit includes at least a first functional block and a second functional block for processing multiple applications. The first functional block includes circuitry that has a first set of parameters of a first process corner. The second functional block includes circuitry that has a second set of parameters of a second process corner with one or more parameters different from one or more parameters in the first set of parameters of the first process corner. As used herein, a "process corner" is a set of parameters that define components of devices of at least a portion of an integrated circuit selected to provide particular device characteristics of at least the portion of the fabricated integrated circuit. As used herein, a "device" is also referred to as a "transistor" such as one of a variety of types of planar and non-planar field effect transistors (FETs or fets). Examples of the device characteristics are device switching speed and device leakage current.

Examples of a set of parameters of a process corner are a carrier mobility of n-type devices, a carrier mobility of p-type devices, a gate oxide thickness of n-type devices, a gate oxide thickness of p-type devices, a doping concentration (or level) of a substrate of n-type devices, a doping concentration of a substrate of p-type devices, a doping concentration of source and drain regions of n-type devices, a doping concentration of source and drain regions of p-type devices, a height of fins of a Fin FET, a width of fins of a Fin FET, a Fin pitch of a Fin FET, a number of nanosheets of a gate all around (GAA) FET, a height of a GAA FET, a total cross-sectional area of the nanosheets of a GAA FET, a type of metal material used to form metal gates of transistors, a number of contacted gate pitches (CPP) of standard cells and memory bit cells, and so forth. Other examples of the set of parameters of the process corner are possible and contemplated.

It is noted that a subset of the parameters of the process corner affect the threshold voltage of transistors. The remainder of the parameters of the process corner do not affect the threshold voltage, but still affect the device characteristics such as device switching speed and device leakage current. For example, the subset of parameters of the process corner that affect the threshold voltage of transistors include the gate oxide thickness of n-type devices, the gate oxide thickness of p-type devices, the doping concentration (or level) of the substrate or well of n-type devices, the doping concentration of the substrate or well of p-type devices, the doping concentration of source and drain regions of n-type devices, the doping concentration of source and drain regions of p-type devices, the type of metal material used to form metal gates, and the channel length under the metal gates.

It is noted that the above parameters of a process corner are parameters of devices used as an end result of semiconductor device fabrication, and are not the same as process parameters used during semiconductor fabrications steps such as which materials and durations of time to use during etching, deposition and implantation that eventually provide circuitry with devices that have the set of parameters of a particular process corner (such as fast, nominal, or slow). For a same set of operating conditions, the second functional block has device characteristics corresponding to the second set of parameters of the second process corner different from device characteristics of the first functional block corresponding to the first set of parameters of the first process corner. Examples of the device characteristics are device switching speed and device leakage current.

Examples of the set of operating conditions are an operating voltage, an operating clock frequency, and an operating state. In some implementations, a power manager or power controller selects an operating state for partitions of the integrated circuit. Examples of the operating state are a sleep state or a powered down state, an idle state, and an active state. Here, the partition can be at the level of a functional block within an integrated circuit or it can be at the level of a sub-block within the functional block. When one or more sub-blocks are operating with the active state, the power manager or controller selects a respective one of multiple power-performance states (P-states) for the active one or more sub-blocks of the functional block. Each of the multiple P-states includes a respective operating voltage and a respective operating clock frequency. In various implementations, the P-states and the operating state adhere to the Advanced Configuration and Power Interface (ACPI) standard for P-states and C-states.

In an example, the first functional block has device characteristics that include faster device switching speeds and larger device leakage currents than device characteristics of the second functional block. Therefore, the first functional block has higher performance, but also higher power consumption, when compared to the second functional block for the same set of operating conditions. When comparing devices between the higher-performance first functional block and the lower-performance second functional block, the devices of the first functional block have a smaller magnitude of threshold voltage (and higher leakage current) than the devices of the second functional block. Accordingly, when comparing devices between the higher-performance first functional block and the lower-performance second functional block, the devices of the first functional block have one or more of a larger carrier mobility for n-type and p-type devices, a smaller gate oxide thickness for n-type and p-type devices, a smaller doping concentration of a substrate for n-type and p-type devices, a larger doping concentration of source and drain regions for n-type and p-type devices, a larger height of Fin FETs or of GAA FETs, and so forth.

In order to have two functional blocks using circuitry of different process corners, the integrated circuit is fabricated with a process corner mask that indicates which area of the die uses the first process corner, and which area of the die uses the second process corner. In one implementation, the process corner mask is transparent in a first area of the mask aligned with an area of the die that includes circuitry that has the first set of parameters of the first process corner. Additionally, the process corner mask is opaque in a second area of the mask aligned with an area of the die that includes circuitry that has the second set of parameters of the second process corner. In other implementations, the transparent and opaque areas of the process corner mask are switched in their indications. An integrated circuit semiconductor fabrication company, or foundry, receives an indication of the new process corner mask such as a file that includes a new marker layer.

In some implementations, each of the first functional block and the second functional block is an instantiation of a same functional block such as a processor core. Instantiations of the same functional block have the same integrated circuit netlist. The integrated circuit netlist provides a list of elements and connectivity information of the elements such as a list of nodes and which terminals of the elements are connected to which particular nodes. The list of elements includes both active devices, such as transistors, and passive elements such as resistors, capacitors, and inductors. The instantiations of the same functional block can also include the same transistor sizes and values for the passive elements. However, two different instantiations of the same functional block have different device characteristics corresponding to two different process corners. Therefore, when only a few threads are running and they are assigned to only one functional block, the operating system scheduler is able to assign these threads to a functional block that includes devices that has the first set of parameters of the higher-performance process corner (faster device switching speeds and higher leakage currents). The other one or more functional block reduce power consumption by including devices that have the second set of parameters of a lower-power process corner or a nominal process corner. Therefore, a subset of functional blocks, such as processor cores, and a subset of other types of functional blocks, of the entire integrated circuit provide higher performance based on the first set of parameters of the higher-performance process. In contrast, the remainder of the integrated circuit provides lower leakage currents and lower power consumption based on the second set of parameters of a lower-power process corner or a nominal process corner.

Turning now to FIG. 1, a generalized diagram is shown of circuit design components 100. The integrated circuit 110 is fabricated with the use of process corner mask 190. The integrated circuit 110 includes processor cores 120a-120h, cache 130, interface 140, unit 150, and blocks 160-174. As shown, the process corner mask 190 has an opaque portion 192 and a transparent portion 194. In an implementation, the transparent portion 194 of process corner mask 190 is aligned with an area of the die of the integrated circuit 110 that has parameters of a first process corner such as circuitry 180. The opaque portion 192 of process corner mask 190 is aligned with an area of the die of the integrated circuit 110, such as circuitry outside of circuitry 180, that has parameters of a second process corner different from the first process corner.

The integrated circuit 110 includes multiple types of designs providing a variety of functionalities on a single semiconductor die. In some implementations, the integrated circuit 100 is a system on a chip (SoC) that includes a variety of processing units and functional blocks providing a variety of functionalities on the single semiconduction die. In an implementation, cache 130, interface 140, unit 150, and blocks 160-174 provide separate functionality. In contrast, each of processor cores 120a-120h provides a same functionality. For example, in some designs, each of processor cores 120a-120h is an instantiation of a same processor core.

It is also possible and contemplated that two or more of the blocks 160-174 provide a same functionality.

In some implementations, the integrated circuit 110 includes a central processing unit (CPU) with circuitry used for processing applications that use instructions of a selected instruction set architecture (ISA), a graphics processing unit (GPU) with circuitry that implements a high parallel data microarchitecture, a Hub used for communicating with multimedia engine, and a multimedia engine with circuitry that processes audio data and visual data for multimedia applications. In another implementation, the unit 150 and the functional blocks 160-174 include one or more application specific integrated circuits (ASICs) or microcontrollers, one or more digital signal processors (DSPs), analog-to-digital converters (ADCs), and digital-to-analog converters (DACs).

The circuitry of the interface 140 communicates with one of an external memory, an external peripheral device, another semiconductor chip, or other. The interface 140 includes queues for storing requests and responses as well as circuitry for supporting a particular communication protocol. Although a single interface is shown, it is possible and contemplated that the integrated circuit 110 uses multiple interfaces. In an implementation, the unit 150 and the functional blocks 160-174 include a communication fabric that supports the transfer of messages, requests, responses, acknowledgments, commands, interrupts, and so forth between the multiple components within the integrated circuit 110 and one or more external processing units and peripheral devices. In various implementations, the multiple components of the integrated circuit 110 supports a cache memory subsystem that includes integrated caches as well as external caches such as the shared cache 130.

In various implementations, a portion of the integrated circuit 110 includes circuitry that has parameters of a first process corner, whereas, another portion of the integrated circuit 110 includes circuitry that has parameters of a second process corner with one or more parameters different from one or more parameters in the first process corner. For example, in an implementation, circuitry 180 includes circuitry that has parameters of the first process corner, whereas, the remainder of the integrated circuit 110 includes circuitry that has parameters of the second process corner.

Examples of a set of parameters of a process corner are a carrier mobility of n-type devices, a carrier mobility of p-type devices, a gate oxide thickness of n-type devices, a gate oxide thickness of p-type devices, a doping concentration (or level) of a substrate of n-type devices, a doping concentration of a substrate of p-type devices, a doping concentration of source and drain regions of n-type devices, a doping concentration of source and drain regions of p-type devices, a height of fins of a Fin FET, a width of fins of a Fin FET, a Fin pitch of a Fin FET, a number of nanosheets of a gate all around (GAA) FET, a height of a GAA FET, a total cross-sectional area of the nanosheets of a GAA FET, a type of metal material used to form metal gates of transistors, a number of contacted gate pitches (CPP) of standard cells and memory bit cells, and so forth. Other examples of the set of parameters of the process corner are possible and contemplated.

It is noted that a first subset of the above parameters of the process corner affect the threshold voltage of transistors. The remainder of the parameters, or a second subset, of parameters of the process corner do not affect the threshold voltage, but still affect the device characteristics such as one or more of device switching speed and device leakage current. For example, the first subset of parameters of the process corner that affect the threshold voltage of transistors include the carrier mobility of n-type devices, the carrier mobility of p-type devices, the gate oxide thickness of n-type devices, the gate oxide thickness of p-type devices, the doping concentration (or level) of the substrate or well of n-type devices, the doping concentration of the substrate or well of p-type devices, the doping concentration of source and drain regions of n-type devices, the doping concentration of source and drain regions of p-type devices, the type of metal material used to form metal gates, and the channel length under the metal gates. The second subset different from the first subset of parameters that do not affect the threshold voltage, but still affect the device characteristics, such as one or more of device switching speed and device leakage current, are a height of fins of a Fin FET, a width of fins of a Fin FET, a Fin pitch of a Fin FET, a number of nanosheets of a gate all around (GAA) FET, a height of a GAA FET, a total cross-sectional area of the nanosheets of a GAA FET, a number of contacted gate pitches (CPP) of standard cells and memory bit cells, and so forth.

For a same set of operating conditions, the remainder of the integrated circuit 110 includes circuitry that has device characteristics corresponding to parameters of the second process corner different from device characteristics of the circuitry 180 that has parameters of the first process corner. Examples of the device characteristics are device switching speed and device leakage current. Examples of the set of operating conditions are an operating voltage, an operating clock frequency, and an active operating state. In some implementations, a power manager or power controller (not shown) selects an operating state for partitions or for the entirety of the integrated circuit 110. Examples of the operating state are a sleep state or powered down state, an idle state, and an active state. When the partition or the entire integrated circuit 110 is operating with the active state, the power manager or controller selects a respective one of multiple power-performance states (P-states). Each of the multiple P-states includes a respective operating voltage and a respective operating clock frequency.

In an implementation, the transparent portion 194 of process corner mask 190 is aligned with an area of the die of the integrated circuit 110 that has parameters of the first process corner such as circuitry 180. The opaque portion 192 of process corner mask 190 is aligned with an area of the die of the integrated circuit 110 that has parameters of the second process corner such as circuitry outside of circuitry 180. In various implementations, a single mask, such as the single process corner mask 190, is used to define which circuitry of the integrated circuit 110 uses parameters of the first process corner and which circuitry of the integrated circuit 110 uses parameters of the second process corner.

An integrated circuit fabrication company, or foundry, fabricates the integrated circuit 110 when the design of the integrated circuit 110 completes, or a "tape out" has occurred for the integrated circuit 110. The integrated circuit foundry (or foundry) is able to use multiple types of process corners such as at least a high-performance process corner (or fast process corner), a low-power process corner (or a slow process corner), and an average process corner (or nominal process corner). Another number and other types of process corners are possible and contemplated. In some implementations, the parameters of the first process corner used by circuitry 180 provide higher performance and higher power consumption than the parameters of the second process corner used by the circuitry of the remainder of the integrated circuit 110. In an implementation, the second process corner is one of the slow process corner and the nominal process corner, whereas, the first process corner is the fast process corner.

When comparing devices between the higher-performance circuitry 180 and the lower-performance remainder of the integrated circuit 110, the devices of the circuitry 180 have a smaller magnitude of threshold voltage (and higher leakage current) than the devices of the lower-performance remainder of the integrated circuit 110. Accordingly, when comparing devices between the higher-performance circuitry 180 and the lower-performance remainder of the integrated circuit 110, the devices of the circuitry 180 have one or more of a larger carrier mobility for n-type and p-type devices, a smaller gate oxide thickness for n-type and p-type devices, a smaller doping concentration of a substrate for n-type and p-type devices, a larger doping concentration of source and drain regions for n-type and p-type devices, a larger height of Fin FETs or of GAA FETs, and so forth. In other words, the devices of the circuitry 180 have been formed by a process corner with one or more parameters different from one or more parameters of a process corner used to form the remainder of the integrated circuit 110.

When the design of the integrated circuit 110 completes, or a "tape out" has occurred for the integrated circuit 110, one or more technical files are sent to the foundry. At least one of these files includes an indication of the first process corner to use for circuitry 180 and an indication of the second process corner to use for the remainder of the integrated circuit 110. At least one of these files also includes mask layout data that includes information describing how multiple masks should be designed for semiconductor fabrication of the integrated circuit 110. This mask layout data provides a graphical representation of a circuit layout. For example, the photomask (or mask) includes transparent areas that define a particular pattern where light used during photolithography is permitted to pass through the mask. The transparent pattern of the mask is used to create thin films of one of various materials over a silicon substrate during fabrication operations such as etching, deposition and implantation. The file with the mask layout data includes design layer numbers corresponding to layers of devices and signal routes. The file with the mask layout data also includes marker layer numbers corresponding to particular signal paths that require high-performance transistors or corresponding to process corners for multiple functional blocks of the integrated circuit 110.

The file with the mask layout data follows a particular file format. In an implementation, this file format is the Graphic Design System, which is also referred to as the Graphic Data System (GDS), file format. There is an updated file format called the GDSII file format. The mask 190 is created from an added marker layer to the GDSII file format that defines the pattern of the transparent portion 194 of the process corner mask 190. In an implementation, the transparent portion 194 of the process corner mask 190 is aligned with an area of the die of the integrated circuit 110 that has parameters of the first process corner such as circuitry 180. The opaque portion 192 of process corner mask 190 is aligned with an area of the die of the integrated circuit 110 that has parameters of the second process corner such as circuitry outside of circuitry 180. In various implementations, a single mask, such as the single process corner mask 190, is used to define which circuitry of the integrated circuit 110 uses parameters of the first process corner and which circuitry of the integrated circuit 110 uses parameters of the second process corner.

In an implementation, the granularity of circuitry identified by the process corner mask 190 for using parameters of a certain process corner is relatively large. In contrast, threshold voltage masks identify signal paths that require high-performance transistors, which is a fine granularity. Comparatively, the granularity of the process corner mask 190 is coarse and this granularity is not at a level of a transistor (or device), is not at a level of a particular signal path (or speed path), and is not at a level within a particular functional block. Rather, the granularity of the process corner mask 190 is at a level of multiple functional blocks. With a coarse granularity and a single mask, the process corner mask 190 is simpler and less expensive than masks used to define threshold voltages of particular transistors across the integrated circuit 110, simpler and less expensive than masks used to define particular metal routes across the integrated circuit 110, and so on. These latter types of masks typically include multiple masks, rather than a single mask. Additionally, these latter types of masks have a far finer granularity, which further increases the costs of these masks.

As described earlier, in some implementations, the parameters of the first process corner used by circuitry 180 provide higher performance (faster device switching speeds) and higher power consumption (larger leakage currents) than the parameters of the second process corner used by the circuitry of the remainder of the integrated circuit 110. The choice of which circuitry of the integrated circuit 110 to include in circuitry 180 is based on design requirements. In one example, each of the processor cores 120a-120h is an instantiation of a same processor core, and thus, each of the processor cores 120a-120h provides a same functionality. When only a few threads are running and these threads are assigned to only one processor core, such as processor core 120d, the operating system scheduler is able to assign these threads to processor core 120d that includes circuitry that has parameters of the higher-performance process corner. Rather than have each of the processor cores 120a-120h use parameters of the higher-performance process corner, which increases leakage current for the integrated circuit 110, only processor cores 120d and 120h are included in circuitry 180 that has parameters of the higher-performance process corner. Therefore, higher performance is achieved when only a few threads are running, but the total power consumption of the integrated circuit 110 is managed by reducing or eliminating the leakage current in the processor cores 120a-120c and 120e-120g.

Compared to the processor cores 120d and 120h, the processor cores 120a-120c and 120e-120g provide lower leakage currents and lower power consumption based on having circuitry that has parameters of a lower-power process corner or a nominal process corner. In some implementations, the cache 130 is included in the circuitry 180 that has parameters of the higher-performance process corner. The cache 130 is representative of a lower cache level of the cache memory subsystem. In an implementation, the cache 130 is a shared level-three (L3) cache. Although cache 130 and processor cores 120d and 120h are the only components shown within circuitry 180 that has parameters of the higher-performance process corner, in other implementations, the number and variety of components included in circuitry 180 varies based on design requirements. It is noted that processor cores 120d and 120h are located closer to the center of the integrated circuit 110, and thus, located closer to heat dissipation solutions provided for the integrated circuit 110. Thus, the processor cores 120d and 120h are selected for the high-performance process corner, which also has higher leakage currents. The near proximity of the heat dissipation solutions, though, help mitigate the effects of the leakage currents and higher power consumption of the processor cores 120*d* and 120*h*.

Further, it is noted that in some implementations, the transparent portion 194 of process corner mask 190 includes an additional transparent portion (not shown) that is aligned with another area (not shown) of the die of the integrated circuit 110, and this additional transparent portion has finer granularity than a level of multiple functional blocks. In some implementations, the finer granularity is at a level of a transistor (or device), or at a level of a particular signal path (or speed path), or at a level of a portion within a particular functional block. In such implementations, the parameters of the first process corner used by circuitry 180 and this other area of the die of the integrated circuit 110 are different from the parameters of the second process corner. Additionally, these parameters of the first process corner include parameters that do not affect the threshold voltage, but still affect the device characteristics such as one or more of device switching speed and device leakage current. Therefore, in such implementations, the parameters of the first process corner include parameters that are also different from parameters of a third process corner used for circuitry identified by a threshold voltage mask. In such implementations, the first process corner includes parameters of the second subset of parameters listed earlier that that do not affect the threshold voltage, but still affect the device characteristics such as one or more of device switching speed and device leakage current.

Referring to FIG. 2, a generalized diagram is shown of a method 200 creating layout for semiconductor chips. For purposes of discussion, the steps in this implementation (as well as in FIG. 4) are shown in sequential order. However, in other implementations some steps occur in a different order than shown, some steps are performed concurrently, some steps are combined with other steps, and some steps are absent. A design team creates a file that includes design layers and one or more marker layers representing layout of an integrated circuit (block 202). In an implementation, the file follows the GDSII file format. In various implementations, the design team uses a mask layout editor tool to draw either the transparent or the opaque patterns of the masks. Some of the masks are created manually while other masks are generated automatically from instantiations of cells from a library.

One of the created masks is a process corner mask that is a single mask used to define which circuitry of the integrated circuit being developed has parameters of a first process corner and which circuitry of the integrated circuit being developed has parameters of a second process corner different from the first process corner. The granularity of the process corner mask is coarse and the granularity is not at a level of a transistor (or device), is not at a level of a particular signal path (or speed path), and is not at a level within a particular functional block. Rather, the granularity of the process corner mask is at a level of one or more functional blocks. With a coarse granularity and a single mask, the process corner mask is simpler and less expensive than masks used to define threshold voltages of particular transistors across the integrated circuit being developed, simpler and less expensive than masks used to define particular metal routes across the integrated circuit being developed, and so on.

When the design of the integrated circuit being developed completes, the design team sends the file to an integration circuit foundry (block 204). The integration circuit foundry (or foundry) receives the file and a processor within a desktop computer or a server at the foundry reads, from the file, a marker layer indicating which functional blocks of the integrated circuit to exclude from a first process corner (block 206). In an implementation, the marker layer includes information that identifies an area of a process corner mask that is opaque. The opaque portion of the process corner mask indicates areas of the integrated circuit that will have circuits that have parameters of a second process corner different from parameters of the first process corner. In such a case, a transparent pattern of the process corner mask indicates areas of the integrated circuit that will have circuits that have parameters of the first process corner. The marker layer also includes information that identifies an area of the process corner mask that is transparent.

Based on the information of the marker layer, the foundry creates a fabrication mask (a photomask, or mask) that has a transparent pattern in areas that are aligned with areas of the integrated circuit to be formed with a first process corner (block 208). The foundry reads the marker layer information from a file, such as a GDSII file, and a laser exposes the pattern, which is provided in the file, on a quartz substrate that is chromium plated. Using this photomask, the foundry forms circuitry, using a first set of parameters of the first process corner, in areas of the integrated circuit that overlap the transparent pattern of the photomask (block 210). Using this photomask, the foundry forms circuitry, using a second set of parameters of a second process corner, in areas of the integrated circuit that overlap the opaque areas of the photomask (block 212).

It is noted that in some implementations, the above first set of parameters of the first process corner are the parameters of the second subset of parameters provided earlier that do not affect the device threshold voltage, but still affect the device characteristics, such as one or more of device switching speed and device leakage current. In such implementations, the areas of the integrated circuit to be formed with the first process corner can have a fine granularity such as at a level of a transistor (or device), or at a level of a particular signal path (or speed path), or at a level of a portion within a particular functional block. A variety of examples of the speed paths and portions of functional blocks are possible and contemplated. For example, the process corner mask can be used to identify a particular analog circuit of the integrated circuit, identify input/output (I/O) interface circuits, and so on.

Referring to FIG. 3, a generalized block diagram of one implementation of a computing system 300 is shown. In the illustrated implementation, the computing system 300 includes the client computing device 350, the servers 320A-320D that include hardware for executing software and supporting the organizational center 310, a network 340, and the data storage 330 that includes one or more data stores supported and used by the organizational center 310. Although a single client computing device 350 is shown, any number of client computing devices utilize the organizational center 310 through the network 340. The client computing device 350, which is also referred to as client device 350, includes hardware, such as circuitry of a processor of the processing unit 370, to execute instructions of tools 360. The tools 360 include at least the mask layout editor 362 and the circuit simulator 364. A designer uses the tools 360 during the design of an integrated circuit. The designer uses the tools 360 to build a circuit model, simulate the circuit model, create mask layout for the circuit model, and extract parasitics from the mask layout for further simulation of the circuit model. The designer also uses the mask layout editor 362 to create marker layers for the entire die of the integrated circuit. One example of these marker layers is a marker layer used to later generate the process corner mask for the integrated circuit.

One or more of the tools 360 use a copy of data stored in the data storage 330. Examples of data used by the tools 360 are copies of the netlist 334 for both components and the entirety of the integrated circuit being designed. Additionally, the tools 360 use at least a portion of the design rule checks (DRCs) 336. The place-and-route tool (not shown) of the tools 360 uses the netlist 334 and a cell layout library that includes both synthesized and custom cells to provide physical layout of the integrated circuit being designed. A copy of the mask layout data 332 is stored in one or more of the data storage 330 and the client device 350.

The client device 350 includes a desktop computer or a mobile computing device such as a laptop, a tablet computer, and so forth. The client device 350 includes hardware circuitry such as a processing unit 370 for processing instructions of computer programs. In some implementations, the processing unit 370 includes one or more homogeneous cores of a processor. In other implementations, the processing unit includes heterogeneous cores such as a parallel processing architected core and a general-purpose core as used in central processing units (CPUs). The parallel architected core is a graphics processing unit (GPU), a digital signal processing unit (DSP) or other.

The client device 350 includes a network interface (not shown) supporting one or more communication protocols for data and message transfers through the network 340. The network 340 includes multiple switches, routers, cables, wireless transmitters and the Internet for transferring messages and data. Accordingly, the network interfaces of the organizational center 310 and the client device 350 support at least the Hypertext Transfer Protocol (HTTP) for communication across the World Wide Web. In addition to communicating with the client device 350 through the network 340, the organizational center 310 also communicates with the data storage 330 for storing and retrieving data.

In various implementations, the organizational center 310 is an infrastructure for a vendor producing one or more hardware products. The organizational center 310 includes an intranet network providing a private network accessible only to an organization's staff. An intranet portal is used to provide access to resources with a user-friendly interface such as graphical user interfaces (GUIs) and dashboards. The information and services made available by the organizational center 310 is unavailable to the general public through direct access. Through user authentication, the staff members are able to access resources through the organizational center 310 to communicate with other staff members, collaborate on projects and monitor product development, update products, documents and tools stored in a centralized repository and so forth.

The servers 320A-320D used for supporting the organizational center 310 and resources accessed through the organizational center 310 include a variety of server types such as database servers, computing servers, application servers, file servers, mail servers and so on. In various implementations, the servers 320A-320D and the client device 350 operate with a client-server architectural model. The client device 350 includes a copy of a particular version of a given software product or tool such as the tools 360. In some implementations, the versions of the tools 360 are based on at least the operating system and the processor(s) used by the client device 350. As described earlier, the organizational center 310 is an infrastructure for a vendor producing one or more hardware products. The integrated circuit is one of a variety of types of integrated circuits being developed for production.

Rather than use a single process corner for the entirety of the integrated circuit being developed, the designer(s) use the processing unit 370 executing the mask layout editor 362 to create the process corner mask 333. In various implementations, the process corner mask 333, which is a single mask, is used to define which circuitry of the integrated circuit being developed include circuits that have parameters of a first process corner and which circuitry of the integrated circuit being developed include circuits that have parameters of a second process corner different from the first process corner. As described earlier, examples of parameters of a process corner are a carrier mobility of n-type devices, a carrier mobility of p-type devices, a gate oxide thickness of n-type devices, a gate oxide thickness of p-type devices, a doping concentration (or level) of a substrate of n-type devices, a doping concentration of a substrate of p-type devices, a doping concentration of source and drain regions of n-type devices, a doping concentration of source and drain regions of p-type devices, a height of fins of a Fin FET, a width of fins of a Fin FET, a Fin pitch of a Fin FET, a number of nanosheets of a gate all around (GAA) FET, a height of a GAA FET, a total cross-sectional area of the nanosheets of a GAA FET, a number of contacted gate pitches (CPP) of standard cells and memory bit cells, and so forth. Other examples of the set of parameters of the process corner are possible and contemplated. These parameters of the process corner affect the switching speed and leakage current of transistors (or devices) such as one of a variety of types of field effect transistors (FETs). It is possible that these parameters and other parameters of the process corner also affect the resistance, inductance, and capacitance parasitics (or RLC parasitics) of corresponding circuitry.

The granularity of the process corner mask 333 is coarse and the granularity is not at a level of a transistor (or device), is not at a level of a particular signal path (or speed path), and is not at a level within a particular functional block. Rather, the granularity of the process corner mask 333 is at a level of one or more functional blocks. With a coarse granularity and a single mask, the process corner mask 333 is simpler and less expensive than masks used to define threshold voltages of particular transistors across the integrated circuit being developed, simpler and less expensive than masks used to define particular metal routes across the integrated circuit being developed, and so on. The designer uses the mask layout editor 362 to create the process corner mask 333 with a transparent pattern in a marker layer. The pattern information of this marker layer is provided in a file such as a GDSII file. When the design of the integrated circuit being developed completes, or a "tape out" has occurred for the integrated circuit, the process corner mask 333 is sent to a foundry along with other mask layout data 332 in one or more files such as GDSII files.

Turning now to FIG. 4, a generalized diagram is shown of a method 400 creating layout for semiconductor chips. A foundry fabricates a first functional block of an integrated circuit using a first set of parameters of a first process corner (block 402). The foundry fabricates a second functional block of the integrated circuit using a second set of parameters of a second process corner different from the first process corner (block 404). For example, the foundry uses a file that contains a marker layer of multiple marker layers of mask layout data, and this marker layer indicates the transparent and the opaque areas of a process corner mask. In some implementations, the transparent area of the process corner mask is aligned with areas of the integrated circuit that has parameters of the first process corner. In other implementations, the opaque area of the process corner mask is aligned with areas of the integrated circuit that has parameters of the first process corner. Therefore, a single process corner is not used across the entirety of the integrated circuit.

If a potential is not applied to an input node of the integrated circuit ("no" branch of the conditional block 406), then the integrated circuit waits for power up (block 408). However, if a potential is applied to the input node of the integrated circuit ("yes" branch of the conditional block 406), then the circuitry of the integrated circuit conveys a current from the input node to an output node of the integrated circuit through one or more of the first functional block and the second functional block (block 410).

When powered up, a power controller selects an active operating state for the integrated circuit, and selects one of multiple P-states for the integrated circuit. The circuitry of the integrated circuit processes one or more applications for a given set of operating conditions (block 412). For example, the given set of operating conditions include the active operating state (versus idle or sleep operating states), and the operating voltage and operating clock frequency of the selected P-state. While processing the applications using the given set of operating conditions, the first functional block uses first device characteristics that correspond to the first set of parameters of the first process corner (block 414). Examples of the device characteristics are device switching speed and device leakage current. While processing the applications using the given set of operating conditions, the second functional block uses second device characteristics that correspond to the second set of parameters of the second process corner (block 416).

In an implementation, the first device characteristics include faster device switching speeds and larger device leakage currents than the second device characteristics. Therefore, the first functional block has higher performance, but also higher power consumption, when compared to the second functional block for the given set of operating conditions. When comparing devices between the higher-performance first functional block and the lower-performance second functional block, the devices of the first functional block have a smaller magnitude of threshold voltage (and higher leakage current) than the devices of the second functional block. Accordingly, when comparing devices between the higher-performance first functional block and the lower-performance second functional block, the devices of the first functional block have one or more of a larger carrier mobility for n-type and p-type devices, a smaller gate oxide thickness for n-type and p-type devices, a smaller doping concentration of a substrate for n-type and p-type devices, a larger doping concentration of source and drain regions for n-type and p-type devices, a larger height of Fin FETs or of GAA FETs, and so forth. The same given set of operating conditions are used in order to perform an accurate comparison. For example, each of the first functional block and the second functional block have all sub-blocks active, and each of the first functional block and the second functional block use the same P-state.

Referring to FIG. 5, one implementation of a computing system 500 is shown. The computing system 500 includes the integrated circuit 510 and the memory 530. Interfaces, such as a memory controller, a bus or a communication fabric, one or more phased locked loops (PLLs) and other clock generation circuitry, a power management unit, and so forth, are not shown for ease of illustration. It is understood that in other implementations, the computing system 500 includes one or more of other processors of a same type or a different type than integrated circuit 510, one or more peripheral devices, a network interface, one or more other memory devices, and so forth. In some implementations, the functionality of the computing system 500 is incorporated on a system on chip (SoC). In other implementations, the functionality of the computing system 500 is incorporated on a peripheral card inserted in a motherboard. The computing system 500 is used in any of a variety of computing devices such as a server computer, a desktop computer, a tablet computer, a laptop, a smartphone, a smartwatch, a gaming console, a personal assistant device, and so forth.

The integrated circuit 510 includes hardware such as circuitry. For example, the processor 510 includes at least functional block 520 and functional block 522. The functional block 520 includes circuitry that have parameters of a first process corner, whereas, the functional block 522 includes circuitry that have parameters of a second process corner different from the first process corner. Examples of the parameters of a process corner were provided earlier in the description of FIGS. 1 and 3-4. Additionally, examples of a first subset of the parameters of the process corner that affect the device threshold voltage was provided earlier. Further, examples of a second subset different from the first subset of the parameters of the process corner that do not affect the device threshold voltage, but still affect the device characteristics, such as one or more of device switching speed and device leakage current, was provided earlier. Therefore, the circuitry across the entirety of the integrated circuit 510 does not have parameters of a single process corner. In various implementations, the integrated circuit 510 includes one or more processing units. In some implementations, each of the processing units includes one or more processor cores capable of general-purpose data processing, and an associated cache memory subsystem. In such an implementation, the integrated circuit 510 is a central processing unit (CPU). In another implementation, the processing cores are compute units, each with a highly parallel data microarchitecture with multiple parallel execution lanes and an associated data storage buffer. In such an implementation, the processor 510 is a graphics processing unit (GPU), a digital signal processor (DSP), or other.

In some implementations, the memory 530 includes one or more of a hard disk drive, a solid-state disk, other types of flash memory, a portable solid-state drive, a tape drive and so on. The memory 530 stores an operating system (OS) 532, one or more applications represented by code 534, and at least source data 536. Memory 530 is also capable of storing intermediate result data and final result data generated by the processor 510 when executing a particular application of code 534. Although a single operating system 532 and a single instance of code 534 and source data 536 are shown, in other implementations, another number of these software components are stored in memory 530. The operating system 532 includes instructions for initiating the boot up of the processor 510, assigning tasks to hardware circuitry, managing resources of the computing system 500 and hosting one or more virtual environments.

Each of the integrated circuit 510 and the memory 530 includes an interface unit for communicating with one another as well as any other hardware components included in the computing system 500. The interface units include queues for servicing memory requests and memory responses, and control circuitry for communicating with one another based on particular communication protocols. The communication protocols determine a variety of parameters such as supply voltage levels, power-performance states that determine an operating supply voltage and an operating clock frequency, a data rate, one or more burst modes, and so on.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. A semiconductor die comprising:
a first functional block on the semiconductor die, the first functional block comprising circuitry fabricated using a first set of parameters of a first process corner; and
a second functional block on the semiconductor die, the second functional block comprising circuitry fabricated using a second set of parameters of a second process corner that is different from the first process corner;

wherein for a given set of operating conditions:
the first functional block has first device characteristics based on the first set of parameters of the first process corner; and
the second functional block has second device characteristics based on the second set of parameters of the second process corner.

2. The semiconductor die as recited in claim 1, wherein the first functional block is fabricated using a first process flow corresponding to the first set of parameters of the first process corner, and the second functional block is fabricated using a second process flow corresponding to the second set of parameters of the second process corner.

3. The semiconductor die as recited in claim 1, wherein the die includes a first region containing the first functional block and a second region containing the second functional block, the first and second regions being physically distinguished by device structures formed using different respective process-corner parameter sets.

4. The semiconductor die as recited in claim 3, wherein the first region aligned with the first functional block is fabricated using the first set of process-corner parameters and the second region aligned with the second functional block is fabricated using the second set of process-corner parameters.

5. The semiconductor die as recited in claim 1, wherein the second process corner that provides the device characteristics of the second functional block comprises values different from values of the first process corner for one or more parameters that include one or more of: a carrier mobility of n-type devices, a gate oxide thickness of p-type devices, and a doping concentration of source and drain regions of n-type devices.

6. The semiconductor die as recited in claim 1, wherein first and second regions of the die are defined by a process-corner photomask having transparent and opaque areas respectively aligned with the first functional block and the second functional block.

7. The semiconductor die as recited in claim 1, wherein each of the first functional block and the second functional block is an instance of a same circuit.

8. A method comprising:
forming, on a semiconductor die, circuitry of a first functional block of an integrated circuit, the first functional block comprising circuitry fabricated using a first set of parameters of a first process corner; and
forming, on the semiconductor die, circuitry of a second functional block different from the first functional block of the integrated circuit, the second functional block comprising circuitry fabricated using a second set of parameters of a second process corner that is different from the first process corner;
wherein for a given set of operating conditions:
the first functional block is configured to exhibit first device characteristics based on the first set of parameters of the first process corner; and
the second functional block is configured to exhibit second device characteristics based on the second set of parameters of the second process corner.

9. The method as recited in claim 8, wherein the second process corner that provides device characteristics of the second functional block comprises values different from values of the first process corner for one or more parameters that include one or more of: a carrier mobility of n-type devices, a gate oxide thickness of p-type devices, and a doping concentration of source and drain regions of n-type devices.

10. The method as recited in claim 8, further comprising:

receiving a file that includes design layers and one or more marker layers representing layout of the integrated circuit; and reading, from the file, a marker layer of the one or more marker layers indicating which functional blocks of the integrated circuit to exclude from the first process corner.

11. The method as recited in claim 10, further comprising creating, based on the one or more marker layers, a photomask that is transparent in a first area of the photomask aligned with an area of the integrated circuit that comprises the first functional block.

12. The method as recited in claim 11, further comprising creating, based on the one or more marker layers, the photomask that is opaque in a second area of the photomask aligned with an area of the integrated circuit that comprises the second functional block.

13. The method as recited in claim 12, further comprising fabricating the integrated circuit using the photomask.

14. The method as recited in claim 8, wherein, for a given set of operating conditions, the circuitry of the first functional block has higher switching speed and higher power consumption than the circuitry of the second functional block.

15. A computing system comprising:

a memory configured to store instructions of one or more tasks and source data to be processed by the one or more tasks; and a semiconductor die comprising:

a first functional block on a semiconductor die, the first functional block comprising circuitry fabricated using a first set of parameters of a first process corner; and a second functional block on the semiconductor die, the second functional block comprising circuitry fabricated using a second set of parameters of a second process corner that is different from the first process corner;

wherein for a given set of operating conditions:

the first functional block has first device characteristics based on the first set of parameters of the first process corner; and the second functional block has second device characteristics based on the second set of parameters of the second process corner.

16. The computing system as recited in claim 15, wherein the device characteristics comprise one or more of device switching speed.

17. The computing system as recited in claim 15, wherein the device characteristics comprise device leakage current.

18. The computing system as recited in claim 15, wherein the given set of operating conditions comprises one or more of an operating voltage, an operating clock frequency, and an active operating state.

19. The computing system as recited in claim 15, wherein the second process corner that provides the device characteristics of the second functional block comprises values different from values of the first process corner for one or more parameters that include one or more of: a carrier mobility of n-type devices, a gate oxide thickness of p-type devices, and a doping concentration of source and drain regions of n-type devices.

20. The computing system as recited in claim 15, wherein the semiconductor die includes first and second regions respectively aligned with the first and second functional blocks, the regions being structurally defined by fabrication using different process-corner parameter sets corresponding to transparent and opaque areas of a process-corner photomask used during fabrication.

* * * * *